No. 879,404. PATENTED FEB. 18, 1908.
F. & F. T. McINTURF.
CORN HUSKING MACHINE.
APPLICATION FILED FEB. 26, 1906.

5 SHEETS—SHEET 1.

No. 879,404. PATENTED FEB. 18, 1908.
F. & F. T. McINTURF.
CORN HUSKING MACHINE.
APPLICATION FILED FEB. 26, 1906.

5 SHEETS—SHEET 2.

Witnesses.

Inventors.
Frederick McInturf.
Frank T. McInturf.
By Coburn & McRoberts
Attys

No. 879,404.

PATENTED FEB. 18, 1908.

F. & F. T. McINTURF.
CORN HUSKING MACHINE.
APPLICATION FILED FEB. 26, 1906.

5 SHEETS—SHEET 3.

Witnesses.

Inventors.
Frederick McInturf.
Frank T. McInturf.
By Coburn & McRoberts
Attys.

THE NORRIS PETERS CO., WASHINGTON, D. C.

No. 879,404. PATENTED FEB. 18, 1908.
F. & F. T. McINTURF.
CORN HUSKING MACHINE.
APPLICATION FILED FEB. 26, 1906.

5 SHEETS—SHEET 4.

Witnesses.
Inventors.
Frederick McInturf
Frank T. McInturf
By Coburn & McRoberts
Attys

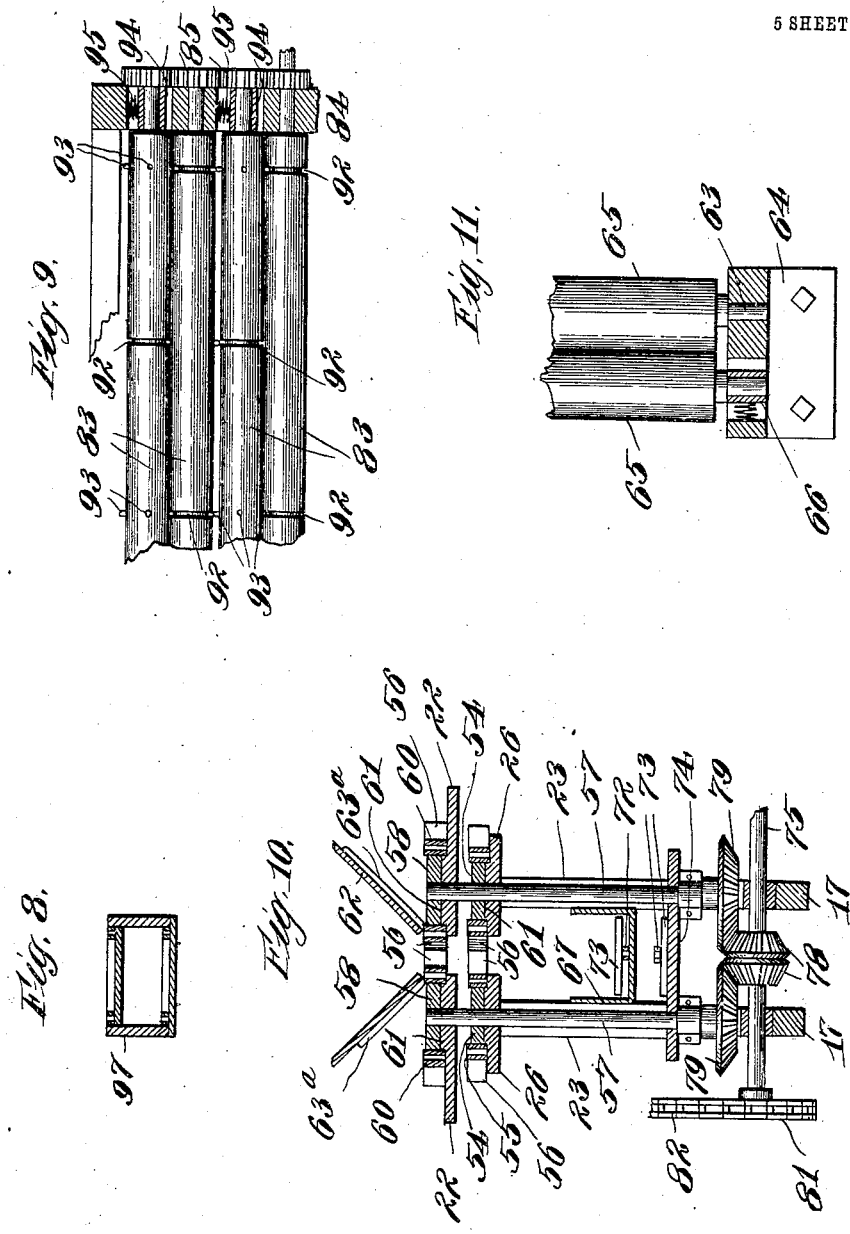

UNITED STATES PATENT OFFICE.

FREDERICK McINTURF AND FRANK T. McINTURF, OF MENDOTA, ILLINOIS.

CORN-HUSKING MACHINE.

No. 879,404.      Specification of Letters Patent.      Patented Feb. 18, 1908.

Application filed February 26, 1906. Serial No. 302,948.

*To all whom it may concern:*

Be it known that we, FREDERICK McINTURF and FRANK T. McINTURF, citizens of the United States, residing at Mendota, in the county of Lasalle and State of Illinois, have invented certain new and useful Improvements in Corn-Husking Machines, of which the following is a specification, reference being had therein to the accompanying drawings.

This invention relates to a combined corn harvester and husker by means of which standing corn in the field may be cut, the ears removed from the stalks, and such ears then husked.

The invention consists of the organizations and arrangements of parts hereinafter particularly described and then pointed out in the appended claims.

Figure 1:
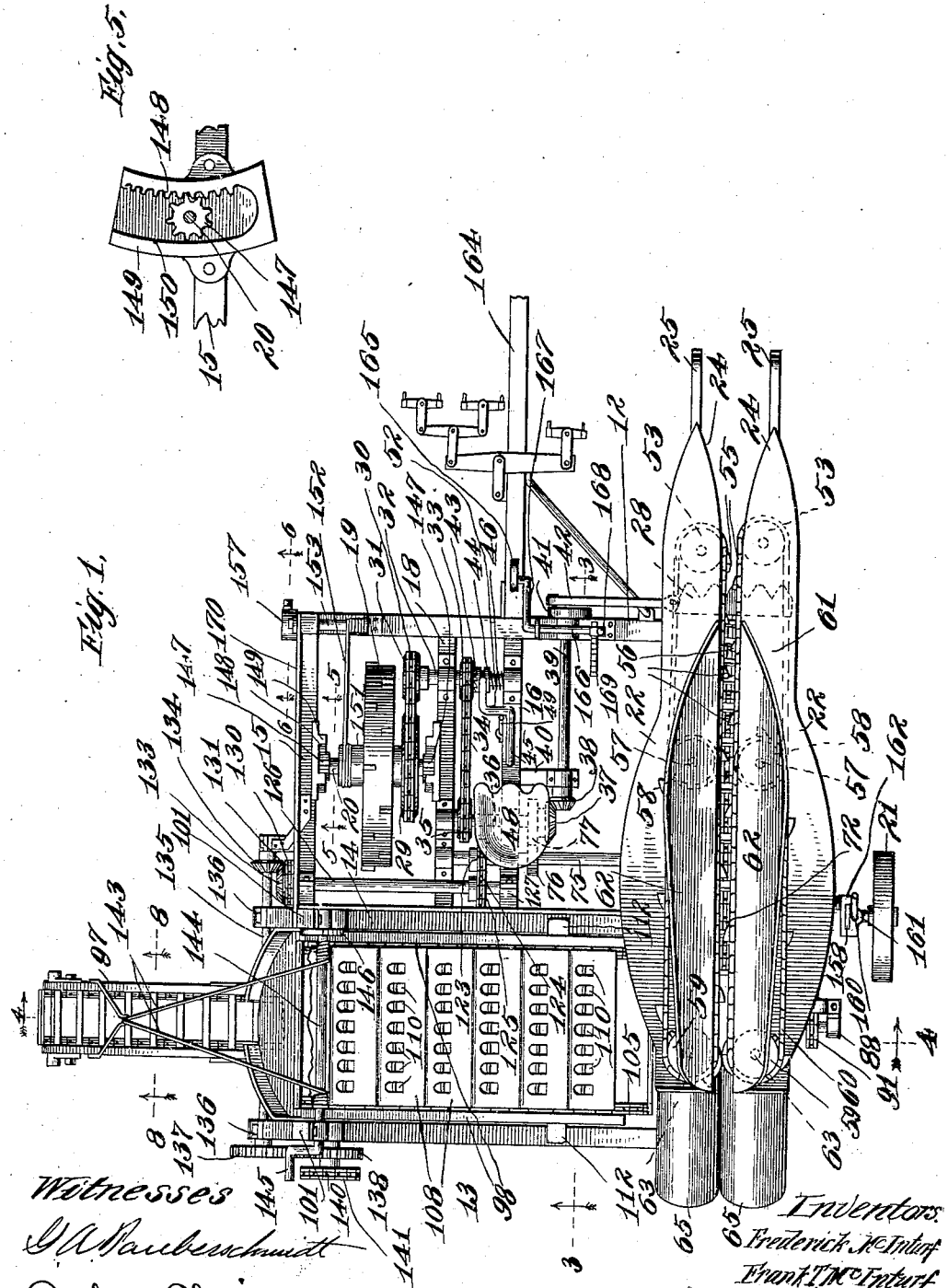
Figure 2:
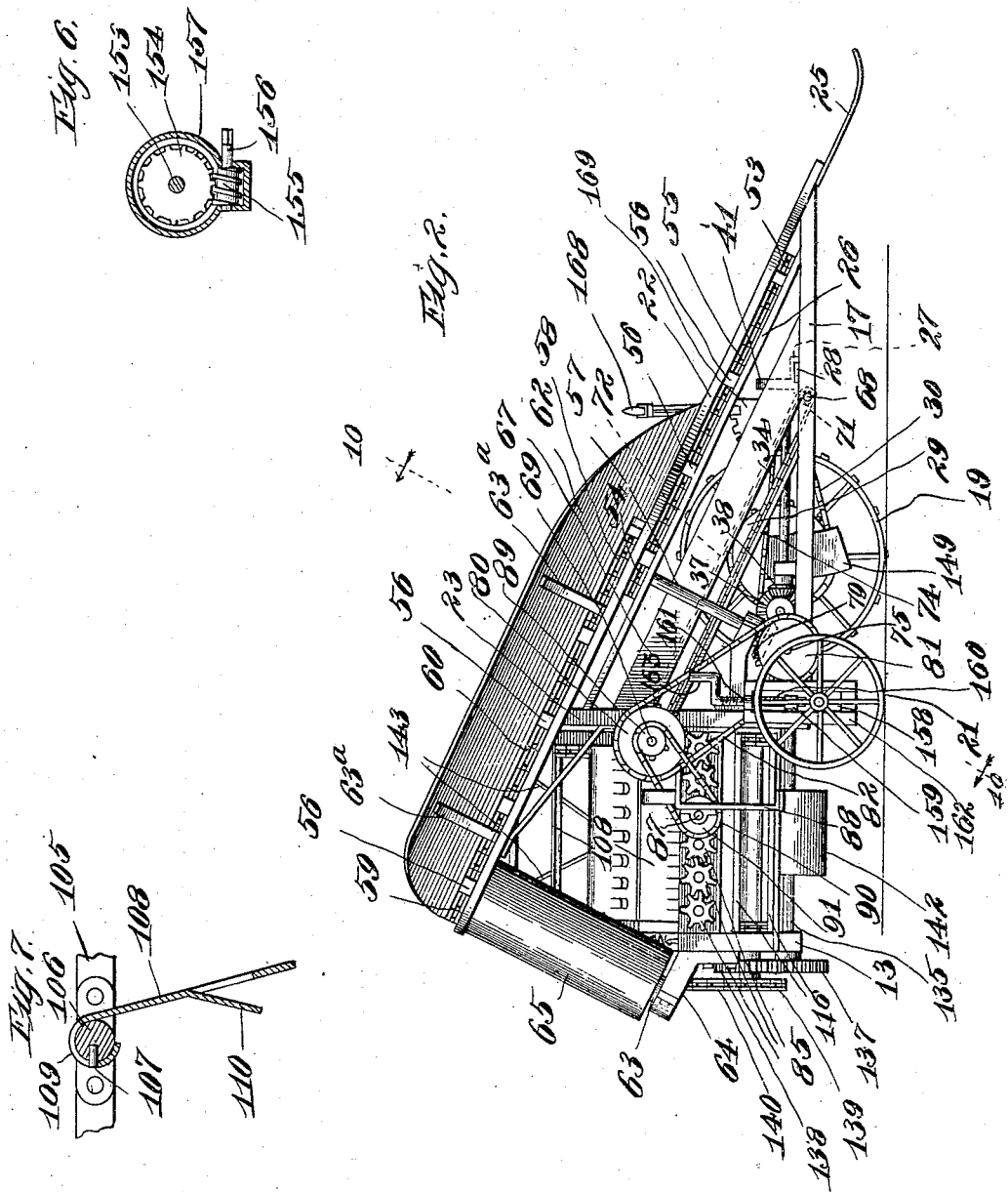
Figure 3:
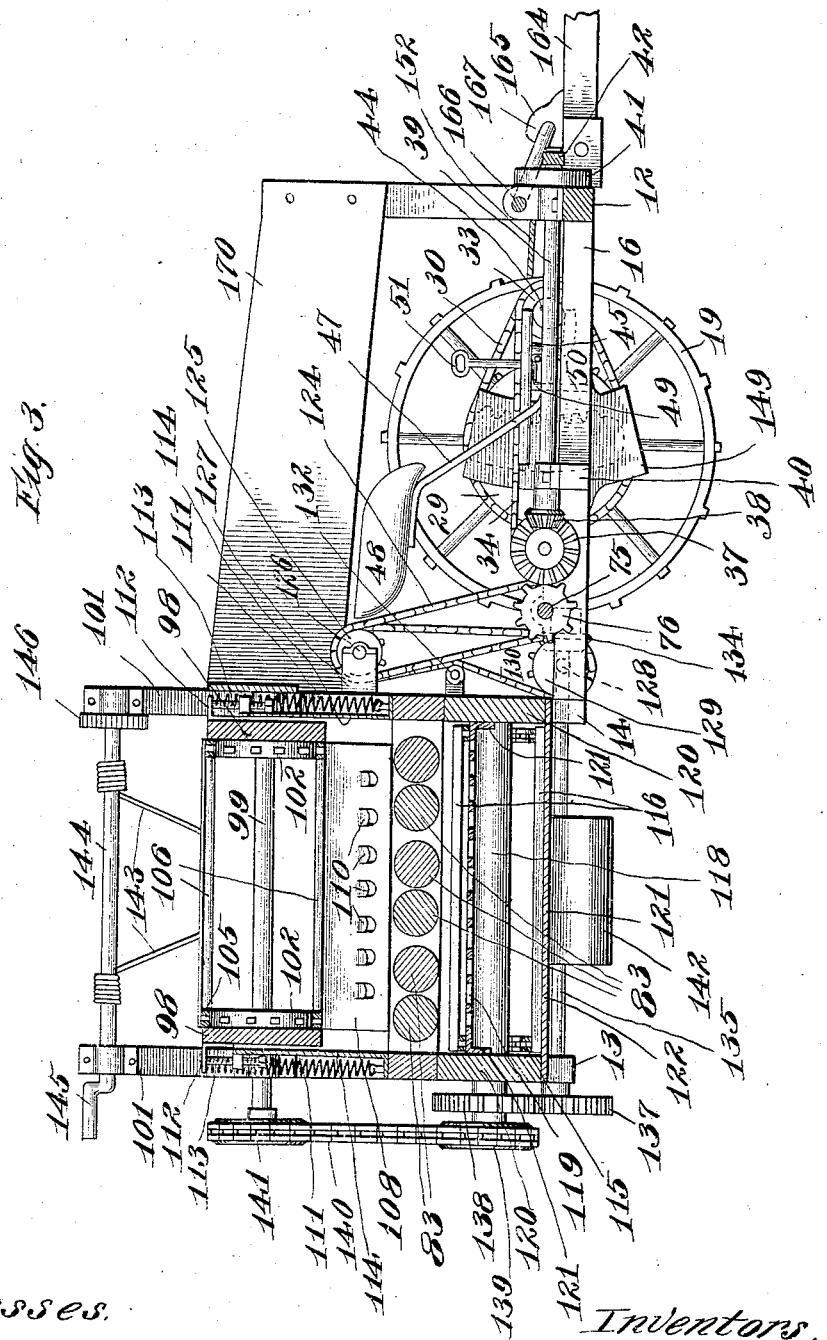
Figure 4:
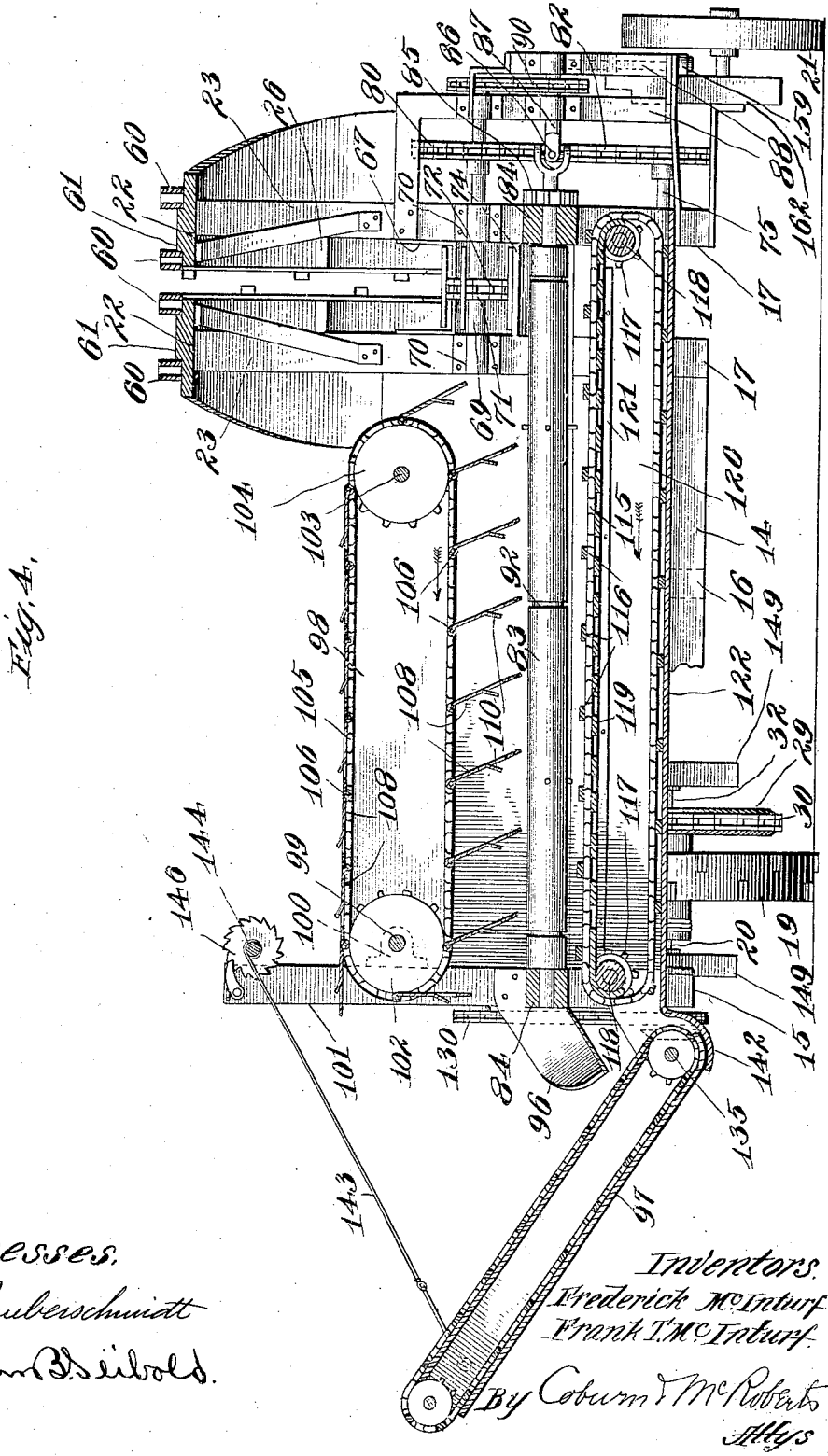

In the accompanying drawings—Figure 1 is a plan view of the combined harvester and husker; Fig. 2 is a view of the same in side elevation; Fig. 3 is a cross-sectional view on the line 3—3 of Fig. 1 on an enlarged scale; Fig. 4 is a sectional view on the line 4—4 of Fig. 1; Figs. 5 and 6 are detail views on an enlarged scale of the mechanism for raising and lowering the machine; Fig. 7 is a sectional view of one of the folding rake teeth; Fig. 8 is a sectional view on the line 8—8 of Fig. 1; Fig. 9 is a fragmentary plan view of the husking rolls; Fig. 10 is a sectional view on the line 10—10 of Fig. 2; and Fig. 11 is a fragmentary view of the snapping rolls.

The frame of the machine may be of any suitable character. In the present instance it consists of front beam 12, rear beam 13, intermediate beam 14, a side beam 15, center beam 16, and a pair of parallel beams 17 at the side of the machine opposite the beam 15. A beam 18 is located between the side beam 15 and center beam 16. These beams forming the supporting frame of the machine may be secured together in any suitable manner. The frame is carried by a traction wheel 19 rotatably mounted on an axle 20 suitably supported by the beams 15 and 18 and a second wheel 21 located at the opposite side of the frame.

An inclined gathering board 22 is located over each of the beams 17, being inclined at a suitable angle, as shown in Fig. 2, with their front ends extended beyond the front beam 12. These beams are supported near their rear ends by uprights 23 and at the front by the extended ends of the beams 17. The boards 22 are suitably spaced apart, as shown in Fig. 1, to permit of the passage of the stalks between the same. The inner edges of the boards 22 at their front ends are curved outwardly, as at 24, to provide a flaring mouth to guide the stalks between the same and to gather in any stalks which may be bent over or out of line. To facilitate this each board 22 at its front end is provided with a curved shoe or runner 25, which running along or close to the ground will pick up or straighten any stalks that may have fallen over. Under and parallel to each board 22 is a board 26, such boards being suitably supported by the frame. The boards 22 and 26 provide a supporting frame for the mechanism for gathering the stalks and conveying them to the snapping rolls and husking mechanism, as hereinafter described. To the rear of the front ends of the boards 22 and reciprocating in suitable guides 27 on the beams 17 is a cutter bar 28, such bar being located under the throat or passage between the boards 22 and 26.

The hub of the wheel 19 is provided with a sprocket wheel 29 and a chain 30 communicates motion to a smaller sprocket wheel 31 fixed on a transverse shaft 32 suitably journaled on the beam 16 and 18. This shaft is provided with a second sprocket wheel 33 loosely mounted thereon to which is adapted a chain 34 communicating motion to a sprocket wheel 35 fixed on a shaft 36 also journaled on the beams 16 and 18. The shaft 36 extends beyond the beam 16 and is provided with a bevel gear 37 communicating motion to a similar gear 38 fixed on a longitudinal shaft 39. The shaft 39 is suitably journaled on a stub beam 40 fixed to the beam 16 and also at its front end on the beam 12. Beyond the beam 12 the shaft 39 is provided with a crank wheel 41 to the pin of which is pivoted a pitman 42 connected to and for reciprocating the cutter bar 28.

The traction wheel 19 communicates motion to the operating mechanism of the machine, and in order to throw such mechanism out of action while the traction wheel is in motion, a suitable clutch is provided. To this end the sprocket wheel 33 has a clutch member 43 fixed thereto with which coöperates a sliding clutch member 44 slidably mounted on the shaft 32. This slidable clutch member is controlled by a horizontal lever 45 having a bell crank 46 at its front end which engages the slidable member 44. The rear end of the lever passes through and is loosely pivoted in the bar 47 which supports the seat 48. A vertical rod 49 is pivoted in the beam 16, as at 50, and the upper end of such rod is offset or in the form of a crank and has a handle 51. A spiral spring 52 on the shaft 32, interposed between the slidable member 44 and the beam 16, tends to hold the clutch coupled. To uncouple the clutch the crank rod 49 is turned at a right angle to the lever 45 and engaging such lever uncouples the clutch. When in such position, the crank rod being on a center, the clutch is held or locked in its uncoupled position.

Near the front end and on the upper face of each board 26 is pivoted a sprocket wheel 53 and a similar sprocket wheel 54 is pivoted on such board at a suitable distance from the front sprocket. A chain 55 is associated with the pair of sprockets 53 and 54 on each board 26 and provided with fingers 56, as shown in Fig. 1. The sprockets 54 are fixed on shafts 57 which extend at a right angle to the inclination of the gathering boards and project above the upper boards 22. Each shaft 57 is provided at its upper end with a sprocket wheel 58. At the rear end of each board 22 is a sprocket wheel 59. Each associated pair of sprocket wheels 58 and 59 is connected by a sprocket chain 60 provided with fingers similar to the fingers 56 on the chains 55. The arrangement is such that the fingers on the two sets of chains project over or in the line of the throat between the gathering boards, and the inner or adjacent stretches of the chains travel rearwardly and in the same direction. As shown in Figs. 4 and 10 the boards are provided with upstanding or raised portions 61, within the confines of the chains thereon, to guide the chains and maintain their adjacent stretches parallel. As shown in Fig. 1 the fingers on each associated pair of chains are arranged in alternation, the spacing corresponding substantially with the spacing of the corn in the rows. A plate 62 is secured as by means of suitable brackets 63ª on each gathering board 22 and these plates are inclined outwardly so as to provide a trough shaped guide as shown in Fig. 10 to prevent the upper ends of the stalks from falling over sidewise.

The sprockets 59 are fixed to shafts 63 which are inclined at a right angle to the gathering boards. The upper end of each shaft is suitably journaled in its associated gathering board 22 while its lower end is pivoted in a bracket 64 suitably carried by the frame. The shafts 63 are provided with cylindrical snapping rolls 65 which coöperate to snap the ears from the stalks. The arrangements of these rollers is such that the bite thereof is in line with the throat between the gathering boards. The shaft 63 of one of the rolls, at each end, is journaled in a spring pressed sliding bearing 66. The spring-pressed bearing for only one end of the shaft is shown in the drawings, the other end of the shaft being similarly mounted in a duplicate bearing. This renders such roll yielding in order to adapt the rolls to stalks of different sizes and avoids clogging.

A trough 67 is located under the throat of the gathering boards parallel thereto. This trough is suitably supported at its ends on the frame of the machine and also by the uprights 23. At each end of the trough is a transverse shaft. The front shaft 68 is journaled on the beams 17 while the rear shaft 69 is journaled in bearings 70 on the uprights 23, as shown in Fig. 4. A sprocket wheel 71 is fixed on each shaft 68 and 69 centrally of the trough, and carried thereby is a chain 72 provided with cross slats 73. The upper stretch of the chain 72 travels on the bottom of the trough 67, and the lower stretch is supported by a board 74 which is secured to the uprights 23 and beams 17 to support the same and prevent interference with the mechanism located thereunder. As shown in Figs. 1 and 2 the cutter bar 28 is located at the front end of the trough so that as the stalks are severed the butts thereof will slide on to the bottom of the trough so as to be engaged by the slats of the chain.

Referring to Figs. 1 and 10, a transverse shaft 75 is suitably journaled in the central beam 16 and the beam 17 and is provided with a pinion 76 which receives motion from a gear 77 fixed on the shaft 36. The shaft 75 is provided with a pair of oppositely facing bevel pinions 78 which engage bevel gears 79 fixed on the lower end of the shafts 57. By the rotation of the shaft 75 the shafts 57 are rotated and in turn communicate motion to the endless chains 55 and 60. As the snapping rollers 65 are fixed to the shafts 63 on which the sprocket wheels 59 are secured motion is also communicated to such rolls. The shaft 69, associated with the chain 72, is provided with a large sprocket wheel 80, which receives motion from a sprocket wheel 81, fixed to the shaft 75, through the medium of a chain 82. The relations of the driving connections are such that the chain 72 is driven at a lower rate of speed than the chains 55, while the latter, owing to the fact that the sprocket wheels carrying the same are of less diameter than the sprockets of the chains 60, travel at a slower speed than the chains 60. By reason of this arrangement, the upper ends of the stalks are engaged by the snapping rolls before the butts leave the butt supporting trough, and moreover are tilted rearwardly so as to enter between the snapping rolls at an angle.

The husking rolls 83 are parallel and disposed in the same plane and extend transversely of the machine, the shafts thereof being journaled in end bars 84, as shown in Fig. 4. These rolls are arranged in pairs and any suitable number of such pairs may be employed, three being shown in the present instance. The inner ends of the rolls are located under the snapping rolls 65 so that the ears of corn will fall thereon. The shafts of the husking rolls are provided with intermeshing pinions 85, as shown in Fig. 2, and one of such shafts is connected by a universal coupling 86, Fig. 4, with a shaft 87 which is journaled upon a pair of suitable uprights 88. As shown in Fig. 2 the shaft 69 is provided with a sprocket 89 which communicates motion through the medium of a chain 90 to a sprocket wheel 91 fixed on the shaft 87. The rolls 83 are inclined downwardly towards the outlet end, and the universal coupling 86 is employed for properly transmitting motion to the inclined roll shafts from the horizontal shaft 87. As shown in Fig. 9, each husking roll is provided lengthwise thereof with alternating annular grooves 92 and radial pins 93, the pins on one roll of each pair being opposite and coöperating with the grooves of the other roll. These pins serve to strip the husks from the ears and the grooves provide clearance therefor, the rolls of each pair being close together. In order to prevent clogging of the rolls and to render the same yielding to inequalities of the husks the shaft of one roll of each pair is mounted in sliding bearings 94, as shown in Fig. 9, and an expansion spring 95 is employed to react against such bearing to press the roll thereof yieldingly against the other roll of the pair. At the outlet end of the husking rolls is a chute 96 the object of which is to discharge the corn on to the conveyer 97.

At opposite sides of the husking rolls 83 and located above the same is a pair of bars 98. These bars provide a pivoted rake-frame and at their outer ends are mounted on a shaft 99 carried in bearings 100 on suitable uprights 101. Near the ends of the shaft 99 and between the bars 98 are sprocket wheels 102. The inner ends of the bars 98 are connected by a shaft 103 provided with sprocket wheels 104. Chains 105 are carried by the sprockets 102 and 104 and these chains are connected at suitable intervals by cross rods 106 each having a radial stop pin 107, as shown in Fig. 7. On each bar 106 is a pivoted tooth 108 which consists in the present instance of a plate bent into the form of a loop at one end to receive the bar 106. The loop of each tooth has a slot 109 into which projects the stop pin 107. The function of these teeth is to move the ears of corn along the husking rolls to bring them under the successive action of the pins 93 and finally push the ears on to the chute 96. The position of the slots 109 is such that the teeth hang at a trailing angle from the under stretch of the chains, as shown in Fig. 4, the teeth preferably being arrested at such angle by the ends of the slots and so as to just clear the pins 93. The teeth are free to swing upwardly and rearwardly, however, in the event that the ears of corn pile up on the husking rolls. These teeth are provided with fingers 110 which serve to assist the teeth in feeding the ears along the rolls. As the teeth pass from the under stretch of the chains around the sprockets 102 they hang vertically, thereby avoiding kicking or throwing the ears outwardly. On the upper or return stretch of the chains the teeth fold downwardly on and are supported in a horizontal position by the chains, on which the ends of the teeth rest, as shown in Fig. 3.

The rake-frame is yieldingly pressed towards the husking rolls 83 by suitable contractile springs 111 the lower ends of which are fixed to the frame of the machine while the upper ends are attached to ears 112 on the inner end of the rake-frame. The rake-frame normally rests on stops 113 carried by side plates 114 and engaged by the ears 112, and the relation of the teeth may be regulated as desired by the adjustment of the stops 113, which in the present instance take the form of screw bolts. In the event of crowding of the ears under the rake, the frame will readily yield owing to the springs, and avoid breakage of the parts. The side plates 114 are located at the sides of the rake and designed to prevent the escape of the ears during the husking operation.

An endless conveyer 115, moving in the direction of the arrow, Fig. 4, is located under and extends longitudinally of the husking rolls 83. This carrier consists of suitable side chains connected by slats 116, the chains being passed over end sprockets 117 which are fixed to shafts 118, suitably journaled on the frame. A reticulated or slotted plate 119, secured to side beams 120 by its flanges 121, is located under and provides a support for the upper stretch of the conveyer 115. The under or return stretch is supported by a suitably supported plate 122 located thereunder.

The rake and conveyer 115 are driven through the medium of suitable connections with the shaft 75. To this end such shaft is provided with a sprocket wheel 123 which transmits motion through the medium of a chain 124 to a sprocket 125 fixed on a shaft 126 suitably journaled, in bearings fixed to the frame of the machine above the beams 15 and 16, one of which is shown in Fig. 3, as at 127. A stub shaft 128 is journaled on the beam 15 and is provided with a sprocket wheel 129 which receives motion through the medium of a chain 130 from a sprocket wheel 131 on the shaft 126. An idler 132 engaging the rear stretch of the chain 130 prevents contact of the latter with the side frame of the husking mechanism. The stub shaft 128 is provided with a bevel gear 133 which transmits motion to a similar gear 134 fixed on a shaft 135 journaled in bearings 136 on the frame of the machine at the end of the husking rolls. The opposite end of the shaft 135 is provided with a gear 137 which communicates motion to a gear 138 fixed on the shaft 118 at the outer end of the conveyer 115. Such shaft is also provided with a sprocket wheel 139 which communicates motion through the medium of a chain 140 to a sprocket 141 on the shaft 99 of the rake.

A curved trough 142 is located at the receiving end of the elevator 97 under the chute 96 and this trough in the present instance consists of the extended end of the plate 121. The elevator 97 may be of any suitable character and the bottom thereof is curved concentric with and extends into the trough 142, the receiving end of the elevator being pivoted on the shaft 135 and receiving motion from such shaft. The elevator 97 is designed to convey the ears to a wagon or any other point and is adjusted through the medium of a suitable cable 143 connected to a shaft 144 pivoted on the uprights 101, such shaft being provided with a crank 145 and a suitable pawl and ratchet 146.

Suitable means are provided for raising and lowering the machine in order to cut the stalks at different heights from the ground. Any suitable means may be employed for this purpose. In the present instance the axle 20 of the traction wheel 19 is provided at its ends with pinions 147 which are adapted to coöperate with curved racks 148 which are concentric with the axle 20. These racks are formed in castings 149 suitably bolted to the beams 15 and 18 and are provided with flanges 150 facing the rack teeth. The axle 20 has fixed thereto a drum 151 to which is connected a cable 152 the other end of which is coiled about a shaft 153 suitably journaled on the front beam 12. The shaft 153 is provided with a worm gear 154 actuated by a worm 155 on a shaft 156 suitably journaled on a casing 157 and adapted to receive a crank for turning the same. By turning such crank it is obvious that through the medium of the connecting cable 155 the axle may be rotated and its pinions coöperating with the racks will raise or lower the frame. The frame is also adjustable with reference to the wheel 21, so as to be adjusted correspondingly with the adjustment on the traction wheel 19. To this end the wheel 21 is mounted on a vertically sliding block 158 having an ear 159 in which is pivoted a screw rod 160. The rod 160 is in threaded engagement with an ear 161 which is formed on a plate 162 secured to the frame of the machine. The plate 162 is provided with a guide way and slides up or down on the block 158 depending upon the direction of rotation of the screw rod 160, the latter being provided with a suitable crank 163 for convenience in turning the same.

The tongue 164 is pivoted to the front beam 12 and is provided with a clip 165. A rod 166 is journaled on the beam 12 and is provided at one end with a crank arm 167, which passes through a suitable aperture in the clip, 165, and at its other with a lever 168. By shifting the lever, the angle of the tongue with relation to the machine may be varied to vary the angle of inclination of the gathering boards and move the runners 25 nearer to or farther from the ground. The lever is provided with a suitable pawl which coöperates with a segment 169 to hold the parts in adjusted position. A suitable brace, such as 170, may be employed, for tying the front and rear portions of the frame together.

In the operation of the machine the stalks enter between the gathering boards 22 and are engaged by the fingers 56 of the chains 55. The fingers serve to hold the stalks while being severed by the cutter 28. The chains 55 carry the stalks upwardly and rearwardly and the butts thereof pass on to the bottom of the trough 67 and are caught by the slats 73 of the chain 72 and carried along the trough. Owing to the difference in speeds of the chains, the stalks are tilted rearwardly at their upper ends and are presented to the snapping rolls 65 at an angle thereto. As the stalks pass between the snapping rolls the ears are broken off and drop on to the husking rolls 83. The stalks pass through the snapping rolls and are discharged on to the ground. Owing to the rotation of the husking rolls 83 and the action of the pins 93, the husks are torn from the ears, being discharged on to the conveyer 115 located under the husking rolls. These husks are carried by the conveyer 115 in the direction of the arrow in Fig. 4 and dropped on to the ground over the end of such conveyer. In the event that any corn is shelled during the husking operation it drops between the husking rollers and falls on to the board 119, through the perforations of which it passes to the plate 121. The slats of the conveyer moving along this plate push such corn into the trough 142 from which it is removed by the elevator and discharged into the receptacle designed to receive the ears of corn. During the husking operation the ears of corn are moved along the husking rollers to the outlet end thereof finally and when completely husked passing through the chute 96 to the elevator.

We make no claim herein to the husking mechanism shown and described, the same being reserved as the subject-matter of our companion application, Serial No. 365,628 filed April 1, 1907.

Having described my invention what I claim as new, and desire to secure by Letters Patent of the United States, is—

1. In a corn harvesting machine, the combination with a cutter for severing the stalks, snapping rolls, of means for feeding the stalks thereto comprising a gathering chain having fingers, and a butt mover and means to drive the butt mover at less speed than the chain.

2. In a corn harvesting machine, the combination with a cutter for severing the stalks, snapping rolls, of means for feeding the stalks thereto and comprising a gathering chain having fingers, a butt support, and means traveling slower than the chain for moving the butt ends of the stalks along the support.

3. In a corn harvesting machine, the combination with a cutter for severing the stalks, snapping rolls, of mechanism for conveying the stalks to the rolls and consisting of a pair of coöperating gathering chains having fingers, a butt support, and an endless conveyer traveling at less speed than the chain for moving the butt ends of the stalks along the support.

4. In a corn harvesting machine, the combination with a cutter for severing the stalks, snapping rolls, of a conveyer for moving the butt ends of the stalks, and a conveyer located above and traveling at greater speed than the butt conveyer, whereby the upper ends of the stalks are tilted rearwardly.

5. In a corn harvesting machine, the combination with a cutter for severing the stalks, snapping rolls, of mechanism for moving the stalks to the snapping rolls and comprising an endless conveyer for moving the butt ends of the stalks, and a pair of chains moving at a higher rate of speed than the said conveyer and engaging the upper ends of the stalks, and a trough through which the butt conveyer travels.

6. In a corn harvesting machine, the combination with a cutter for severing the stalks, a pair of inclined snapping rolls, stalk gatherers having shoes and providing a stalk throat between the same, successive pairs of endless chains having fingers extending into the throat, a trough located under the throat, and an endless conveyer consisting of a chain having slats traveling through the trough to move the butt ends of the stalks and traveling at a slower rate of speed than the said pair of chains whereby the upper ends of the stalks are tilted rearwardly.

In testimony whereof we affix our signatures in presence of two witnesses.

FREDERICK McINTURF.
FRANK T. McINTURF.

Witnesses:
RAYMOND McINTURF.
CASPER FREY.